3,819,663
CATALYST RECYCLE
Irving E. Levine, 41 Thornwood Road, Stamford, Conn. 06903; Harold A. Huckins, 56 Finley Road, R.F.D. 2, Princeton, N.J. 08540; and Stanley Herzog, 91 Engle St., Tenafly, N.J. 07670
No Drawing. Filed Oct. 27, 1971, Ser. No. 193,161
Int. Cl. C07d 1/08
U.S. Cl. 260—348.5 L
2 Claims

ABSTRACT OF THE DISCLOSURE

The present invention relates to the catalytic epoxidation of olefinic materials using organic hydroperoxide epoxidizing agents and is particularly directed to novel procedures for the recovery and recycle of the epoxidation catalyst.

BACKGROUND OF THE INVENTION

A fairly recent development of enormous significance has been the discovery of the catalyzed reaction between an organic hydroperoxide and an olefinically unsaturated material whereby the olefinic material is converted with a very high degree of selectivity to the corresponding oxirane compound. Basic U.S. patents directed to this technology are U.S. 3,351,635 and 3,350,422.

As taught in the above patents, suitable catalysts can be prepared in a number of ways. For example, finely divided metal can be reacted with a hydroperoxide solution in order to produce a soluble form of the metal which is then conveniently employed in the reaction. Alternatively, the catalyst may be added directly to the reaction system.

Regardless of the method of originally adding the catalyst, it is of course economically desirable that the catalyst be recovered and recycled. After separation of the valuable products of the reaction, a heavy organic stream remains which contains substantially all of the catalyst. This stream can be recycled directly to the epoxidation but in a continuous cyclic operation the impurities associated with the stream build up and interfere with the desired epoxidation reaction. Of course, it is possible to take a purge stream in sufficient amount to maintain the impurities at a low level but necessarily the purge stream is fairly large in size thus resulting both in a waste of the contained catalyst values and also in a pollution problem insofar as the disposal is concerned.

SUMMARY OF THE INVENTION

In accordance with the present invention, in the process involving the reaction of an organic hydroperoxide such as tertiary butyl hydroperoxide with an olefin such as propylene in order to produce the corresponding oxirane compound, and wherein the reaction is carried out in the presence of a molybdenum, vanadium, tungsten, or titanium catalyst, a method has been discovered whereby the catalyst can be conveniently and easily recovered and recycled. In accordance with the invention, the advantages of substantially complete recycle of the catalyst values without a build-up of impurities in the epoxidation zone can be achieved while at the same time valuable products can be recovered, and used, for example, as fuel while, as a further advantage, pollution problems are abated and overcome.

Generally, in a process involving the production of propylene oxide by the catalytic reaction of hydroperoxide such as tertiary butyl hydroperoxide and propylene, the reaction mixture is subjected to a series of fractionation steps whereby there are consecutively separated as distillate unreacted propylene, propylene oxide product and tertiary butyl alcohol product. From the last fractionation there is obtained a heavy organic liquid bottoms stream in which is contained essentially all of the molybdenum, tungsten, vanadium or titanium catalyst which was employed in the epoxidation.

In accordance with the present invention, it is this heavy organic stream which is subjected to a wiped film evaporation treatment in order to recover valuable components contained therein and also in order to concentrate the epoxidation catalyst into a form which is suitable for re-use in the subsequent epoxidations with but a minimum of further treatment.

As a result of the wiped film evaporation step there are removed from the heavy organic stream volatile and distillable components which components are the very same materials which tend to interfere with subsequent epoxidation reactions. The volatile materials which are removed in this fashion include various acids and esters as well as oxygenated condensation products which are predominantly formed during the epoxidation. A distinct advantage of the invention is that through the use of the wiped film evaporator these volatilized materials are obtained essentially free of contained metal residues and thus can be employed directly in furnaces in order to make use of their inherent fuel values. It might be pointed out that prior efforts to utilize the fuel value of the entire heavy fraction which contained epoxidation catalyst residues resulted in the fouling of furnace apparatus through the deposition of metal on surfaces contained therein.

Depending upon the degree to which the heavy catalyst residue values containing organic stream is volatilized, the resulting residue will be obtained either as a liquid or as a finely divided free flowing solid. In the case where the catalyst residue is obtained in the form of a liquid, this liquid can be conveniently incorporated in a liquid process stream, e.g., a portion of the hydroperoxide reagent stream or in another liquid such as the alcohol which corresponds to the hydroperoxide used, and reused in the epoxidation process. Where a solid catalyst residue is obtained, procedures such as those described in U.S. 3,507,809 or 3,434,975 can be used to redissolve the catalyst for reuse.

DETAILED DESCRIPTION OF THE INVENTION

In order to more clearly describe practice of the invention, the following description is provided which is specific to the preparation of propylene oxide through the molybdenum catalyzed reaction of tertiary butyl hydroperoxide and propylene. It should be understood that the invention is not intended to be limited to this system but has general applicability in molybdenum, tungsten, titanium or vanadium catalyzed hydroperoxide epoxidation of olefinic materials. In particular, it is intended that the process of the present invention be applicable to the entirety of olefinic materials and hydroperoxide reactants as set for the in above referred to U.S. Pats. 3,351,635 and 3,350,422.

Insofar as appropriate temperature and pressure conditions of the epoxidation reaction, proportions of reactants, reaction time and the like, reference is made to said U.S. Pats. 3,351,635 and 3,350,422. In general, propylene in substantial excess of that stoichiometrically required for the reaction is contacted in the liquid phase with tertiary butyl hydroperoxide in the presence of the molybdenum catalyst. The reaction is preferably carried out in a continuous fashion although batch techniques can also be employed. The effluent from the epoxidation reaction contains predominantly propylene oxide product, tertiary butyl alcohol both formed from the tertiary butyl hydroperoxide reagent and also as introduced into the epoxidation zone conventionally in admixture with the hydroperoxide, unreacted propylene, the molybdenum catalyst, and minor quantities of impurities including formic acid, acetic acid, propylene glycol, dipropylene glycol, water and glycol ethers such as the mono tertiary butyl ether of propylene glycol.

The product-containing effluent mixture is subjected to a series of fractional distillations whereby there are consecutively separated unreacted propylene, product propylene oxide, and product tertiary butyl alcohol. It is advantageous in the last of the distillations to carry out the fractionation such that the liquid bottom stream contains substantial quantities of the tertiary butyl alcohol in order to accomplish a separation whereby substantially none of the low boiling organic acid type impurities is separated overhead with the tertiary butyl alcohol.

The procedures for accomplishing the above distillation separations are well known and in this invention are carried out in accordance with known and straightforward procedures. See for example, U.S. Pat. 3,449,219 and British Pat. 1,143,333.

The heavy liquid bottoms stream from the last of the above-named distillation comprises the heavy organic fraction which is treated in accordance with the subject invention. Normally this stream contains up to about 10% by weight tertiary butyl alcohol although for purposes of this invention the tertiary butyl alcohol content is not critical and can vary widely from practically 0% to 40 or 50% by weight. Also contained in said heavy fraction are the formic acid, acetic acid, propylene glycol, dipropylene glycol, glycol ethers and water which are impurities formed in very small but still significant quantities, usually during the epoxidation. The heavy fraction also, of course, contains the molybdenum epoxidation catalyst in the form of an organic compound which is soluble in the said liquid fraction.

As above described this heavy fraction cannot be recycled directly to the epoxidation zone in view of the fact that the impurities contained therein and most notably the formic and acetic acid impurities interfere with the epoxidation reaction. The deleterious effect of these acids is particularly pronounced in a continuous system due to a build-up of the concentration of these materials where a direct recycle is employed. Nor can the heavy stream be directly burned in order to utilize the heat content thereof since in such an operation the molybdenum is converted to molybdenum trioxide which settles out on surfaces in the furnace interfering with and ultimately interrupting the furnace operation.

In accordance with the present invention, this heavy fraction is subjected to the wiped film evaporation treatment in order to separate volatile materials from the fraction, said volatile materials including most of the acidic compounds which are deleterious in the epoxidation. Customary and regular procedures cannot be employed in accomplishing a resolution of this heavy fraction in view of the tendency of the molybdenum containing residue to cake, coat and block conventional apparatus.

As part of the invention, at least two overall procedures can be conveniently carried out. In one embodiment, the wiped film distillation can be carried out to the extent that about 60 to 85% by weight of the original liquid fraction is evaporated and taken overhead leaving a liquid molybdenum containing residue which can then be directly employed in subsequent epoxidations after appropriate admixture with various other liquid streams. This is a particularly preferred procedure since the obtained liquid residue as above indicated can readily be incorporated in an oganic process stream or compound and re-used. The wiped film evaporation is preferably carried out in a fixed clearance rigid blade evaporator although other known type apparatus can be used.

Alternatively, in a second embodiment the wiped film evaporation can be carried out to the extent that 85 to 97% by weight of the liquid fraction is taken overhead leaving a finely divided solid molybdenum containing residue from which the molybdenum can conveniently be extracted and reused in the epoxidation. In this embodiment the evaporation can be carried out in a single step in, for example, a swinging blade evaporator. It is preferred, however, in the interests of economy to carry out the evaporation to solid residue in two steps, the first step being evaporation to a concentrated liquid in a rigid blade evaporator as above described and the second step being the evaporation to solid in the swinging blade evaporator.

In either of the above embodiments, the volatile materials recovered overhead are essentially free of contained epoxidation catalyst and can either be worked up for the recovery of the various individual components or alternatively can be burned without further treatment as clean fuel in a furnace whereby the contained heat values are efficiently and economically recovered.

With regard to the thin film evaporation, in either of the two embodiments of the invention it is advantageous in a first evaporation to carry out the evaporation by rapidly heating the heavy fraction to a bottoms temperature in the range of about 375–450° F. at essentially atmospheric pressure in an agitated film evaporator which employs a rigid rotor with fixed wall clearance. The evaporation is continued until 60 to about 85% by weight of the charged liquid has been separated as overhead vapor from the liquid catalyst containing residue.

In a preferred embodiment of the invention a portion of the catalyst containing heavy liquid from the wiped film evaporation is recycled to the epoxidation with another portion being purged from the system in order to prevent accumulation of resinous materials associated with the catalyst. In this embodiment it is advantageous to admix the heavy molybdenum containing liquid with a tertiary butanol containing stream in order to increase the fluidity of the liquid and make it easier to handle during the recycle operation. However, this dilution is not strictly necessary for successful practice of the invention as the heavy liquid from the evaporation itself can successfully be recycled directly to the epoxidation wherein the molybdenum content functions quite effectively to catalyze further epoxidation reaction.

In a second preferred embodiment of the invention, the heavy liquid fraction containing molybdenum from the above evaporation is further concentrated in an agitated film evaporator which also incorporates scraping means such as a series of swinging blades which scrape the heated wall down which the concentrated residue flows by gravity. In this second evaporation apparatus, the material is heated to a bottoms temperature of 550–650° F. at about atmospheric pressure and evaporation is continued until a total of 85 to 97% of the original liquid charge to the first evaporator has been volatilized and removed from the molybdenum containing residue. During this evaporation, the molybdenum containing residues are successively concentrated until fluidity disappears and a solid residue remains. The scraping means continuously removes the solid residue from the walls of the evaporator as a fine powder which powder falls to the bottom and is collected for future use. The free flowing powder contains substantially all the molybdenum originally in the feed to the evaporators as a solid illustratively having from about 15 to 20 weight percent molybdenum.

It should be noted that in each of the evaporation steps the evaporation should be carried out in stainless steel or other corrosion resistant equipment and that the evaporation preferably be carried out in the absence of oxygen or other oxidizing agents. The presence of oxygen tends to convert the contained molybdenum from a soluble organic type compound to molybdenum trioxide which is considerably more difficult to redissolve and use in subsequent epoxidations.

The molybdenum containing powder from the second evaporation is advantageously admixed in an organic liquid which also contains tertiary butyl alcohol and tertiary hydroperoxide as well as monopropylene glycol and the resulting mixture is heated for a time sufficient to dissolve most and preferably all of the contained molybdenum from the solid powder. The resulting solution is filtered in order to separate the undissolved solids which are predominantly in the form of elemental carbon which can be disposed of without creating any pollution problems and the liquid filtrate is eminently suitable for recycle to the epoxidation wherein the contained molybdenum is quite satisfactory as catalyst for futher propylene oxide formation.

Obvious departures from the specifics of the above teachings can be employed. The temperatures and pressures employed in each of the wiped film evaporator steps can vary widely, the important thing being the extent to which the evaporation is carried out. Likewise, insofar as evaporation apparatus is concerned, known and conventional wiped film evaporating apparatus can be employed and in the case of the two step procedure known apparatus with scraping means are used.

In order to illustrate practice of the invention the following examples are provided in which Example 1 is a comparative example wherein fresh molybdenum metal powder is initially employed, Example 2 illustrates the first described embodiment of the invention wherein the molybdenum containing residue is concentrated in one step to a molybdenum containing liquid which is recycled to the process and Example 3 illustrates the two step concentration and recycle of molybdenum containing solids.

Example 1

Tertiary butyl alcohol in amount of 130 grams, propylene glycol in amount of 6 grams and finely divided molybdenum metal powder in amount of one gram were admixed in an agitated heated vessel. Nine grams of tertiary butyl hydroperoxide contained as a 42% by weight solution in tertiary butyl alcohol was added and the mixture heated to reflux at one atmosphere for two and one half hours to produce a molybdenum containing catalyst solution.

This resulting solution was employed as the catalyst feedstock in the epoxidation of propylene as hereinafter described.

Example 2

The molybdenum-containing heavy liquid fraction remaining after recovery of propylene oxide from epoxidation effluent as described in Example 4 (containing tertiary butyl alcohol, formic acid, acetic acid, propylene glycol, heavy materials such as ether of propylene glycol and water) was evaporated in a wiped film evaporator at a bottoms temperature of 400° F. until 80 weight percent of the charge had been evaporated overhead.

A portion of the molybdenum containing liquid bottoms from the evaporation was diluted after being heated to 100° C. with five times its weight of tertiary butyl alcohol for ease of handling and was used as catalyst in an epoxidation as hereinafter described.

Example 3

A portion of the molybdenum containing liquid bottoms from the evaporation of Example 2 was further concentrated in an agitated film evaporator which had a series of swinging blade scrapers at a bottoms temperature of 600° F. until an additional 15% based on the total weight of the original heavy liquid was evaporated. This made a total of 95% of the original charge to the first evaporator which was removed in the first and second evaporation steps. The residue was a finely divided molybdenum containing powder containing approximately 15 weight percent molybdenum. This powder was admixed per part by weight contained molybdenum with 80 parts tertiary butyl alcohol, 18 parts tertiary butyl hydroperoxide contained as a 42 weight percent solution in tertiary butyl alcohol and 9 parts of propylene glycol. The mixture was heated to its boiling point and refluxed at atmospheric pressure for one hour at which time a further 18 parts of tertiary butyl hydroperoxide as a 42 weight percent solution in tertiary butyl alcohol was added. The resulting mixture was refluxed for 4 more hours, cooled and filtered and the liquid employed as catalyst in an epoxidation as hereinafter described.

Epoxidations were conducted using each of the catalyst solutions of Examples 1, 2 and 3. In each case the molybdenum solution was charged to a reaction vessel containing tertiary butyl hydroperoxide admixed with tertiary butyl alcohol, sufficient catalyst containing solution being employed to provide a concentration of 100 p.p.m. of molybdenum in the reaction liquid. Propylene was pressured into the reaction vessel which was maintained at 132° C. for one hour. At the end of the reaction, the reaction mixture was analyzed to determine conversion of the contained hydroperoxide, the selectivity of propylene oxide formation and high boiler formation based on converted hydroperoxide. In each case, the reagents and reaction conditions were identical except for the derivation of the molybdenum catalyst containing stream. The following table describes the results obtained:

| Metallic source | Percent hydroperoxide converted from TBHP[1] | Propylene oxide, molar selectivity from TBHP[1] | High boilers, weight selectivity from TBHP[1] |
|---|---|---|---|
| Example: | | | |
| 1 — Virgin metal | 99.81 | 86.49 | 10.1 |
| 2 — Recycle liquid | 99.69 | 87.86 | 8.3 |
| 3 — Recycle powder | 99.43 | 89.67 | 4.8 |

[1] Tertiary butyl hydroperoxide.

Example 4

This example is presented to illustrate a preferred continuous process employing the present invention, all parts and percentages are by weight unless otherwise indicated.

Propylene is epoxidized with tertiary butyl hydroperoxide in the presence of a molybdenum catalyst in a continouus manner. To the epoxidation zone there is added 100 parts per hour, molar, of propylene, 7 parts per hour, molar, of tertiary butyl hydroperoxide as a 40 mole percent solution in tertiary butanol and sufficient catalyst as hereinafter described to make 100 p.p.m. (by weight) of molybdenum in the reactor liquid effluent. The catalyst is comprised of 50% fresh catalyst prepared by adding powdered molybdenum to tertiary butyl hydroperoxide and tertiary butyl alcohol as described in Example 1 and 50% recycle molybdenum prepared as hereinafter described. The epoxidation reaction zone is maintained at a temperature of 125° C. and autogeneous pressure, in this case 720 p.s.i.a., residence time therein is 20 minutes. Conversion of tertiary butyl hydroperoxide is 80 percent and the selectivity to propylene oxide is 91%.

The reaction mixture passes from the epoxidation reaction zone and is first distilled in a two column sequence to remove propylene overhead away from the heavier constituents, the propylene being recycled to the reaction zone. The pressure in the first of the columns is sufficiently high to permit condensation of the overhead propylene with cooling water while the bottoms also contains sufficient propylene (plus, of course, propylene oxide and tertiary butyl alcohol) to allow the bottoms temperature to remain reasonably low. The column contains 12 theoretical vapor-liquid contacting stages and operates with a reflux ratio (mols of net liquid overhead product per mole of reflux) of 0.8:1. The overhead temperature and pressure are respectively 55° C. and 335 p.s.i.a. while the bottoms temperature and pressure are respectively 118° C. and 340 p.s.i.a.

The second column operates at a lower pressure and is used to remove the balance of the propylene from the propylene oxide-tertiary butyl alcohol solvent. Operating characteristics for this second column are an overhead temperature and pressure of respectively 9.5° C. and 67 p.s.i.a. and a bottoms temperature and pressure respectively of 118° C. and 72 p.s.i.a. The column contains 18 theoretical vapor-liquid contacting stages and operates with 0.6 mol of liquid reflux per mol of feed entering the column. Because of the low overhead condensing temperature, the second column requires vapor compression and/or refrigeration facilities to permit condensation of propylene. The bottoms from the second column in such a system is an essentially propylene-free mixture comprising propylene oxide and tertiary butyl alcohol.

The propylene oxide is separated overhead away from the tertiary butyl alcohol and heavier components and sent to a distillation zone for further refining. The column performing such a separation consists of 25 theoretical vapor-lqiuid contacting devices and operates at a reflux ratio of 4.5 to 1. The column pressure is 20 p.s.i.g. in order to be able to condense propylene oxide against water. The liquid bottoms is sent to another fractionation zone where the bulk of the tertiary butyl alcohol is recovered from the still heavier boiling materials which include organic acid, peroxide, mono propylene and higher glycols. This zone consists of 10 theoretical contacting devices operating below 300° F. to limit peroxide decomposition. Pressure is below atmospheric and there is recovered 377 parts by weight of a heavy organic liquid containing molybdenum catalyst with a composition by weight of 0.34% molybdenum expressed as molybdenum metal, 12% tertiary butyl alcohol, 5.2% formic acid, 3.4% acetic acid, 10% propylene glycol and about 70% of heavy materials. This liquid is evaporated to a bottoms temperature of 400° F. and 1 atmosphere pressure in a wiped film evaporator and 67% by weight is removed overhead as vapor and bottoms liquid in amount of 124 parts which contain approximately 1.0% by weight molybdenum expressed as the metal is obtained. One half is admixed with 5 parts by weight of tertiary butanol at a temperature of 150° F. and this solution is then recycled to the epoxidation step and with the fresh molybdenum catalyst described above comprises the catalyst solution used therein.

This example represents practice of the invention with partial recycle of molybdenum catalyst using liquid evaporator bottoms as the source of molybdenum for recycle. An additional improvement can be achieved by further concentrating the bottoms from the first thin film evaporator and using the bottoms from the second stage concentration as the source of molybdenum for recycle. This results in further increasing the recovery of reused molybdenum and decreasing the usage of virgin molybdenum. It further greatly reduces the final waste disposal problem as will be seen from the following example.

Example 5

For each part of liquid residue bottoms from the first thin film evaporator described above in Example 4 one half is recycled as liquid to the epoxidation reaction. The remaining one half is fed to a second thin film evaporator which functions to produce a dry powder bottoms. The second evaporator incorporates a series of freely swinging blades which spread and agitates the liquid feed on the heated surface until it has been concentrated to dryness, after which these blades scrape the dry residue off the heated surface to produce the final dry powder. Evaporation of approximately 90% of the feed to this second evaporator at 600° F. and one atmosphere produces a dry powder bottoms containing 10% molybdenum.

The dry powder bottoms in amount of 6.4 parts is charged to an agitated vessel containing 51 parts of tertiary butanol, 6 parts of propylene glycol and 28 parts of a solution containing 42 weight percent tertiary butyl hydroperoxide in tertiary butanol. The resulting slurry is heated to its boiling point and refluxed at essentially one atmosphere pressure for one hour, at which time a further 28 parts of a solution containing 42 weight percent tertiary butyl hydroperoxide in tertiary butyl alcohol is added. The resulting mixture is refluxed for four more hours at essentially one atmosphere. This mixture is then cooled to 120° F. and filtered to remove the undissolved solids. The filtrate is collected and stored and pumped to the epoxidation reaction as described in Example 4 as a source of suitable soluble molybdenum catalyst, where it replaces the corresponding amount of fresh molybdenum catalyst without adversely effecting the epoxidation. The undissolved solids (dry weight) remaining after filtration constitute approximately 10% of the weight of second stage evaporator dry powder bottoms originally charged to this soluble catalyst preparation step.

The filter cake is washed with 0.9 parts of tertiary butanol and the wash liquid is then combined with the principal filtrate described above to constitute a portion of the liquid mixture containing dissolved recycled molybdenum catalyst. The wet filter cake remaining from the second stage evaporator dry powder bottoms after dissolution of the contained molybdenum is next washed with 6.4 parts of water per pound of dry solids and dried to a free flowing powder containing approximately 10 weight percent molybdenum. The dried cake is essentially completely inert, consisting principally of molybdenum and carbonaceous material and as such it constituted a source of readily available molybdenum for such uses as steel alloying.

What is claimed is:

1. In a process for the epoxidation of an olefinic compound with an organic hydroperoxide in the presence of a molybdenum epoxidation catalyst, wherein the reaction mixture is resolved into product fractions including a heavy liquid fraction containing the epoxidation catalyst, the improvement comprising subjecting the heavy liquid fraction containing the catalyst to a wiped film evaporation at 375 to 450° F. until 60 to 80% by weight of the said fraction is evaporated overhead, and recycling the evaporation residue, to the said epoxidation.

2. In a process for the epoxidation of an olefinic compound with an organic hydroperoxidfe in the presence of a molybdenum epoxidation catalyst, wherein the reaction mixture is resolved into product fractions including a heavy liquid fraction containing the epoxidation catalyst, the improvement comprising subjecting the heavy liquid fraction containing the catalyst to a wiped film evaporation at 375 to 450° F. until 60 to 85% by weight of the said fraction is evaporated overhead, further evaporating residue from said evaporation at 550 to 650° F. in a swinging blade evaporator until a total of 85 to 97% by weight of the original charge has been evaporated in the two evaporations, and recycling residue from the last evaporation to the said epoxidation.

References Cited

UNITED STATES PATENTS 3,573,226   3/1971   Sorgenti _____ 252—431
3,515,647   6/1970   Van Tassell et al. __ 159—6 W

OTHER REFERENCES

R. Fischer: Chemical Engineering, Sept. 13, 1965, pp. 186-190.

Chemical Engineering, Dec. 23, 1963, pp. 52, 54.

NORMA S. MILESTONE, Primary Examiner

UNITED STATES PATENT OFFICE
CERTIFICATE OF CORRECTION

Patent No. 3,819,663     Dated June 25, 1974

Inventor(s) Irving E. Levine et al.

It is certified that error appears in the above-identified patent and that said Letters Patent are hereby corrected as shown below:

Column 2, line 55, "set for the" should read -- set forth --.

Column 6, line 1, after "liquid" insert -- portion --.

Column 7, line 9, "vapor-lqiuid" should read -- vapor-liquid --.

Column 8, line 27, "constituted" should read -- constitutes --;

Column 8, line 38, "60 to 80%" should read -- 60-85% --.

Column 8, line 42, "hydroperoxidfe" should read -- hydroperoxide --.

Signed and Sealed this twenty-fifth Day of November 1975

[SEAL]

Attest:

RUTH C. MASON
Attesting Officer

C. MARSHALL DANN
Commissioner of Patents and Trademarks